…

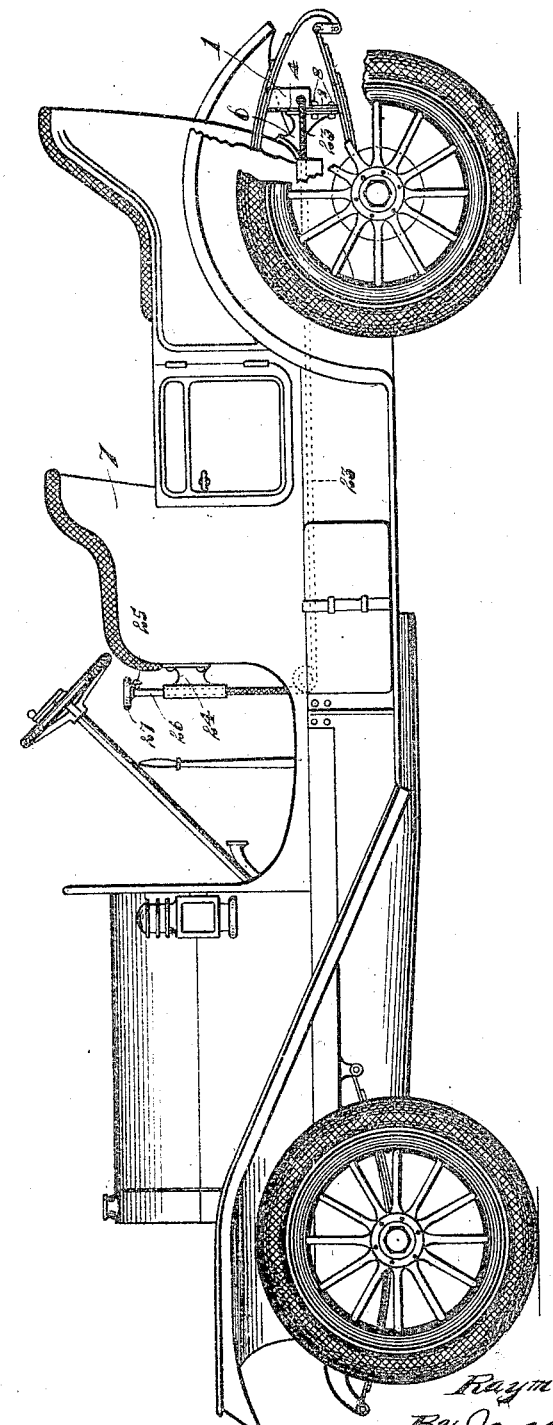

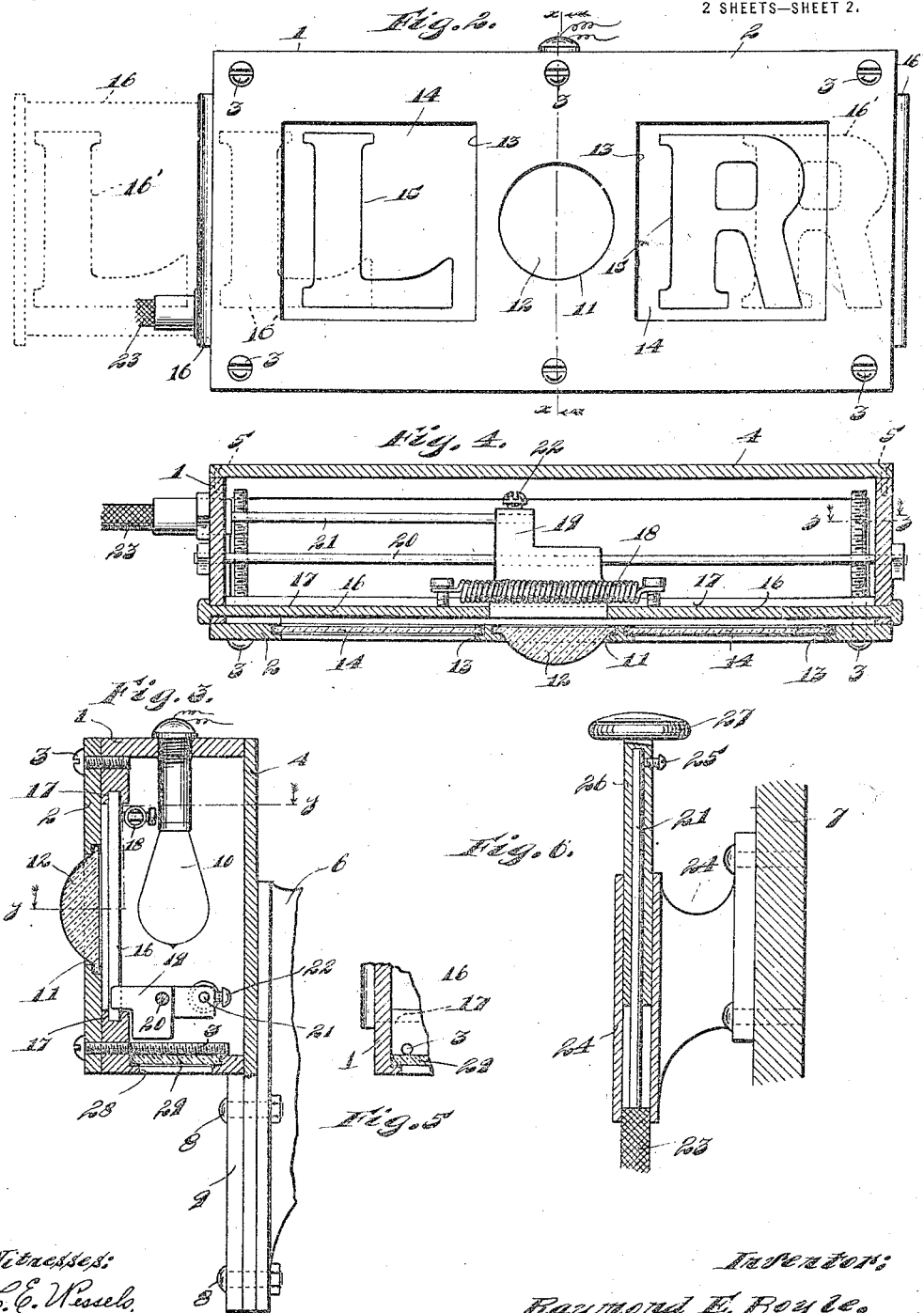

UNITED STATES PATENT OFFICE.

RAYMOND E. BOYLE, OF CHICAGO, ILLINOIS.

VEHICLE-SIGNAL.

1,142,016.

Specification of Letters Patent.

Patented June 8, 1915.

Application filed March 16, 1914. Serial No. 825,041.

*To all whom it may concern:*

Be it known that I, RAYMOND E. BOYLE, a citizen of the United States, and a resident of the city of Chicago, county of Cook, and State of Illinois, have invented certain new and useful Improvements in Vehicle-Signals, of which the following is a specification.

My invention relates to improvements in signals for vehicles and has for its object the production of a signaling device through the medium of which the driver of a vehicle may inform the driver of a vehicle behind of the intention of the former to turn his vehicle to the right or left.

A further object is the production of a signal of the character mentioned which will be of durable and economical construction and efficient in use.

Other objects will appear hereinafter.

With these objects in view, my invention consists in the combinations and arrangements of parts hereinafter described and claimed.

The invention will be best understood by reference to the accompanying drawings forming a part of this specification, and in which, Figure 1 is a side elevation, partly in section, of an automobile equipped with a signaling device embodying my invention, Fig. 2 is a front elevation of the body of the signaling device, detached, Fig. 3 is a section taken on substantially line $x$—$x$ of Fig. 2, Fig. 4 is a section taken on substantially line $y$—$y$ of Fig. 3, Fig. 5 is a detail section taken on substantially line $z$—$z$ of Fig. 4, and Fig. 6 is a sectional detail of one end of the operating element of the device.

The preferred form of construction as illustrated in the drawings comprises a rectangular housing adapted, when the device is in use, to be arranged at the rear end of the vehicle. Said housing comprises a body 1 the front wall 2 of which is secured in position by screws 3. The rear wall 4 of said housing is secured to the body 1 by means of screws 5. When the device is in use, said housing is mounted upon a bracket 6 which is secured to the body of the vehicle at the rear end thereof, said housing being fastened to said bracket by means of screws and bolts 8 which pass through the lower end portion of the bottom plate 4. Said screws and bolts also serve as a means of fastening a license number plate 9 in position, said plate being arranged upon the front side of the bottom member 4 immediately below the body 1.

Arranged within the housing is an electric lamp 10 which serves as a means of illumination when the device is in use. Formed in the front wall 2 of the housing is a central circular opening 11 in which is suitably mounted a colored danger signal lens 12. Also formed in the front wall 2 at either side of the opening 11 are rectangular openings 13 in which are mounted plates 14 having transparent letters 15 formed therein as shown, the letters L and R being used, which are abbreviations of left and right respectively.

Arranged immediately behind the plates 14 are opaque slides 16 the upper and lower edges of which are slidably mounted in guide grooves 17 formed in the housing body 1 as clearly shown in Fig. 3. Coöperating with said slides 16 is a helical tension spring 18 connected at its respective ends with said slides, said spring being very light and adapted to normally hold said slides at their inner terminals of movement or in registration with the plates 14 so as to prevent the passage of light from the lamp 10 through the letters 15. The outer ends of the slides 16 are enlarged, as clearly shown in Fig. 4, to constitute stops which limit the inward movement of said slides. Interposed between the inner ends of said slides 16 is a block 19 which is slidably mounted upon a bar 20 extending longitudinally of the housing body 1. The arrangement is such that lateral movement of the slides 16 so as to project the outer ends thereof from the housing body 1, as shown in dotted lines in Fig. 2, may be effected by sliding said block upon the rod 20, it being clear that when said block is moved to the left, the left hand slide 16 will be forced outwardly and, when said block is moved to the right, the other of said slides 16 will be moved outwardly. Such movement of the block 19 is effected by means of a flexible wire 21 which is connected at one end with said block by means of a set screw 22. The opposite end of said wire projects through a flexible conduit 23 to the front end of the vehicle, the front end of said conduit being secured in a bracket 24 arranged in close proximity to the driver's seat of the vehicle. The corresponding end of the wire 21 is secured by means of a set screw 25 to a tubular member 26 which is slidably mounted in the bracket 24, the arrangement being such that longitudinal movement or shifting of said wire in order to effect operative movement of the block 19 is secured by depressing the member 26 or pulling the same upwardly. The outer end of said member 26 is provided with a head 27 in order to facilitate actuation thereof as mentioned. The wire 21 is of course of such gage as to render the same sufficiently stiff to give the necessary push to block 19 upon depression of head 27, while at the same time it is sufficiently flexible to readily pass the turns in the conduit 23.

With a device of this construction, when the driver of the vehicle upon which it is arranged desires to turn to the left or right he needs only to depress or pull the member 26 in order to shift the block 19. When this is done the slide 16 corresponding with the side toward which the driver wishes to turn will be moved outwardly so as to be visible to the driver behind. The plates 16 at the opposite sides of the device will be provided at their front sides with letters 16' corresponding to the letters 15 upon the plates 14, which letters 16' will, upon outward movement of said plates, be exposed and thus serve to notify the driver behind of the contemplated action of the machine ahead. The slides 16 are of course effective only in daylight but, with the construction set forth, the lamp 10 will be lighted at night so that when one or the other of said slides 16 is moved outwardly through actuation of the member 26, the corresponding letter 15 will be illuminated and thus serve as a signal in the dark. When the member 26 is released after actuation, as mentioned, the spring 18 will operate to retract the extended plate 16, the plate 16 when in normal position serving to exclude the light of the lamp 10 from the plates 14 and hence the transparent lettering 15 thereof.

The bottom wall of the housing body 1 is provided with an elongated opening 28 in which is arranged a transparent glass plate 29 which permits of the passage of light from lamp 10 downwardly in order to illuminate the license number upon the plate 9. The screws 3 of the front plate 2 of the housing body at the lower edge of said plate are so arranged and extend inwardly to such an extent as to engage over the upper side of the plate 29 thereby serving to securely hold the latter in position, as clearly shown in Figs. 3 and 5. With this arrangement then it will be seen that the device serves the double function of a signaling device and a license number plate holder.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the class described comprising a housing having illuminating means arranged therein, the front side of said housing being provided with openings; transparent plates arranged in said openings; opaque members movably mounted in said housing behind said plates; means for normally holding said members in registration with said plates, said members, when moved from registration with said plates, being visible from without; and means for separably moving said members, said means comprising a member movably mounted in said housing adapted, when moved in one direction, to move one of said opaque members and, when moved in the other direction, to move the other of said opaque members, substantially as described.

2. A device of the class described comprising a housing having illuminating means arranged therein, the front side of said housing being provided with openings through which the light from said illuminating means is adapted to pass; opaque members movably mounted in said housing for movement into and out of registration with said openings, said members, when in registration with said openings, preventing the passage of light from said illuminating means therethrough and, when moved from registration with said openings, being visible from without; means for yieldingly holding said opaque members normally in registration with said openings; a reciprocatory member mounted in said housing adapted, when moved in one direction, to actuate one of said opaque members, and, when moved in the other direction, to actuate the other of said opaque members; and a shiftably mounted elongated flexible element connected with said reciprocatory member for reciprocating the same, substantially as described.

In testimony whereof I have signed my name to this specification in the presence of two subscribing witnesses.

RAYMOND E. BOYLE.

Witnesses:
JOSHUA R. H. POTTS,
B. G. RICHARDS.